United States Patent [19]

Tomisawa et al.

[11] Patent Number: 5,679,892
[45] Date of Patent: Oct. 21, 1997

[54] TEMPERATURE-SENSITIVE FLOW AMOUNT DETECTION APPARATUS FOR INTERNAL COMBUSTION ENGINE

[75] Inventors: Naoki Tomisawa; Hajime Hosoya, both of Atsugi, Japan

[73] Assignee: Unisia Jecs Corporation, Kanagawa-ken, Japan

[21] Appl. No.: 692,974

[22] Filed: Aug. 7, 1996

[30] Foreign Application Priority Data

Aug. 8, 1995  [JP]  Japan .................................. 7-202440

[51] Int. Cl.$^6$ .............................. G01F 1/68; G01M 15/00
[52] U.S. Cl. ...................... 73/118.2; 73/118.1; 73/202.5; 73/204.11
[58] Field of Search ................... 73/115, 23.31, 73/116, 117.2, 117.3, 118.1, 118.2, 202.5, 204.11

[56] References Cited

U.S. PATENT DOCUMENTS

| | | | |
|---|---|---|---|
| 4,373,383 | 2/1983 | Plapp et al. | 73/118.2 |
| 4,420,971 | 12/1983 | Rapps et al. | 73/118.2 |
| 4,565,091 | 1/1986 | Ito et al. | 73/118.2 |
| 4,596,138 | 6/1986 | Ito et al. | 73/118.2 |
| 4,669,306 | 6/1987 | Akiyama et al. | 73/118.2 |
| 4,741,313 | 5/1988 | Shimomura | 73/118.2 |
| 4,756,185 | 7/1988 | Shimomura | 73/118.2 |
| 4,771,632 | 9/1988 | Kubo | 73/118.2 |
| 4,796,588 | 1/1989 | Shimomura et al. | 73/118.2 |
| 4,846,133 | 7/1989 | Shiraishi et al. | 73/118.2 |
| 4,887,462 | 12/1989 | Gneiss | 73/118.2 |
| 4,934,189 | 6/1990 | Tanimoto et al. | 73/118.2 |
| 5,199,300 | 4/1993 | Kienzle et al. | 73/118.2 |
| 5,392,643 | 2/1995 | O'Kennedy et al. | 73/118.1 |

FOREIGN PATENT DOCUMENTS 5-133781   5/1993   Japan .

*Primary Examiner*—George M. Dombroske
*Attorney, Agent, or Firm*—Lowe, Price, LeBlanc & Becker

[57] ABSTRACT

A pull-down resistor is connected to a power source line between power source connectors and a detector circuit in an apparatus in which a power source is connected via the power source connectors to the detector circuit, which includes a temperature-sensitive resistor and which outputs a voltage signal to a control unit via signal connectors. The pull-down resistor increases current flow to the power source connectors thus to suppress oxide formation thereon. A pull-up resistor or a pull-down resistor is connected to a signal line between the signal connectors and a filter circuit in the control unit, in order to increase an electric current that flows into the signal connector terminals thereby to prevent the formation of an oxide film on the signal connector terminals.

4 Claims, 3 Drawing Sheets

TEMPERATURE-SENSITIVE FLOW AMOUNT DETECTION APPARATUS FOR INTERNAL COMBUSTION ENGINE

BACKGROUND OF THE INVENTION

1. Field of the Invention

The present invention relates to an apparatus for detecting an intake air amount of an internal combustion engine and, particularly, to an apparatus of a structure for detecting an intake air amount of an engine based upon a change in resistance of a temperature-sensitive resistor disposed in an intake air passage of the engine.

2. Related Art of the Invention

There has heretofore been proposed an apparatus for detecting an intake air amount of an engine by using a temperature-sensitive resistor as disclosed in Japanese Unexamined Patent Publication (Kokai) No. 5-133781.

According to this apparatus, a bridge circuit is constituted inclusive of a temperature-sensitive resistor which is disposed in an intake air passage of the engine, and an electric current supplied to the bridge circuit is controlled based upon a non-equilibrium voltage of the bridge circuit. The electric current supplied according to the flow rate of the intake air amount is taken out as a terminal voltage of a reference resistance in the bridge circuit to thereby detect the intake air amount of the engine.

When a large electric current flows into the temperature-sensitive resistor, it becomes necessary to increase a heat capacity to cope with the heat generated by the temperature-sensitive resistor. However, an increase in the heat capacity deteriorates response characteristics to a change in the flow amount. In order to improve response characteristics, therefore, it is necessary to decrease the electric current that flows into the temperature-sensitive resistor, i.e., to decrease the electric current that flows into the detector circuit thereby to decrease the heat capacity required by the temperature-sensitive resistor.

However, as a result that the electric current supplied to the detector circuit is suppressed in order to improve response characteristics as described above, if a small current flows to a terminal of a connector that connects the detector circuit to a power source or connects the detector circuit to a processing circuit, an oxide film is liable to be formed on the terminal of the connector causing an instantaneous breakage or a poor contact of the circuit.

Formation of the oxide film can be prevented by plating the connector terminal with gold, which, however, results in a great increase in the manufacturing cost.

SUMMARY OF THE INVENTION

The present invention was accomplished in view of the abovementioned problems and its object is to prevent in advance the formation of an oxide film on the connector terminals without incurring a great increase in the manufacturing cost and without deteriorating response characteristics in the flow amount detection.

In order to accomplish the above-mentioned object, a temperature-sensitive flow amount detection apparatus for an internal combustion engine according to the present invention, wherein a voltage signal from a detector circuit is input to a processing circuit via a signal connector, is characterized in that a pull-up resistor or a pull-down resistor for increasing a current that flows into a terminal of the signal connector is connected to a voltage signal line in the processing circuit.

That is, the current that flows into the terminal of the signal connector is increased by an amount of current that flows into the pull-up resistor or into the pull-down resistor, in order to suppress the formation of an oxide film on the terminal of the signal connector.

When the processing circuit is equipped with a filter circuit, it is preferable that the pull-up resistor or the pull-down resistor is connected to a preceding stage of the filter circuit.

In this constitution, provision of the pull-up resistor or the pull-down resistor makes it possible to avoid a change in time constant of the filter circuit.

In the case of a constitution in which an output current of the detector circuit flows to the processing circuit side from the detector circuit side, the pull-down resistor is connected to the voltage signal line in the processing circuit, thereby enabling to increase a current that flows into the terminal of the signal connector.

On the other hand, in the case of a constitution in which the output current of the detector circuit flows to the detector circuit side from the processing circuit side, the pull-up resistor is connected to the voltage signal line in the processing circuit, thereby enabling to increase a current that flows into the terminal of the signal connector.

The temperature-sensitive flow amount detection apparatus for an internal combustion engine of the present invention, wherein furthermore, the detector circuit and the power source are connected together via a power source connector, is characterized in that the pull-down resistor for increasing the current that flows into the terminal of the power source connector is connected to a power source line in the detector circuit.

In this constitution, a current that flows into the terminal of the power source connector is the sum of a current that flows through the pull-down resistor and a current that flows into the detector circuit. Therefore, the current that flows into the terminal of the power source connector is increased thereby to suppress the formation of the oxide film.

Here, it is preferable that the processing circuit that receives the voltage signal from the detector circuit detects the intake air flow amount based on the comparison of the voltage signal with a reference voltage, and feeds, as a power source voltage, a power source voltage of the reference voltage to the detector circuit.

According to this constitution, since a change in the power source voltage affects both the voltage signal output from the detector circuit and the reference voltage on the processing circuit side, it is possible to suppress the occurrence of detection error caused by a change in the power source voltage. With this constitution, however, the current that flows into the detector circuit is decreased and consequently, the current that flows into the terminal of the connector is decreased, compared with the case where the battery is directly connected as a power source to the detector circuit. However, a decrease in the current can be compensated by the provision of the above-mentioned resistor thereby to avoid the formation of an oxide film on the terminal portions.

It is further preferable that a heater is provided in the intake air passage and is controlled to be maintained at a constant temperature, that the temperature-sensitive resistor constituting the detector circuit includes a temperature-sensitive resistor provided close to the upstream side of the heater and a temperature-sensitive resistor provided close to the downstream side of the heater, and that different voltage signals are output depending upon the intake air flow amount in the forward direction and the intake air flow amount in the reverse direction.

According to this constitution, the temperature-sensitive resistor located on the downstream side of the heater receives heat of the heater and is maintained nearly at a constant temperature whereas the temperature-sensitive resistor located on the upstream side of the heater changes its temperature (resistance) depending upon the intake air flow amount. Here, as the direction of flow of the intake air is inverted due to the intake pulsation, since the temperature-sensitive resistor located on the downstream side of the heater is replaced, the intake air flow amount can be detected by discriminating the flow in the forward direction over the flow in the reverse direction of the intake air.

Other objects and aspects of the present invention will become obvious from the following description of the embodiments in conjunction with the accompanying drawings.

PREFERRED EMBODIMENTS

Embodiments of the present invention will now be described in conjunction with the drawings.

Figure 1:
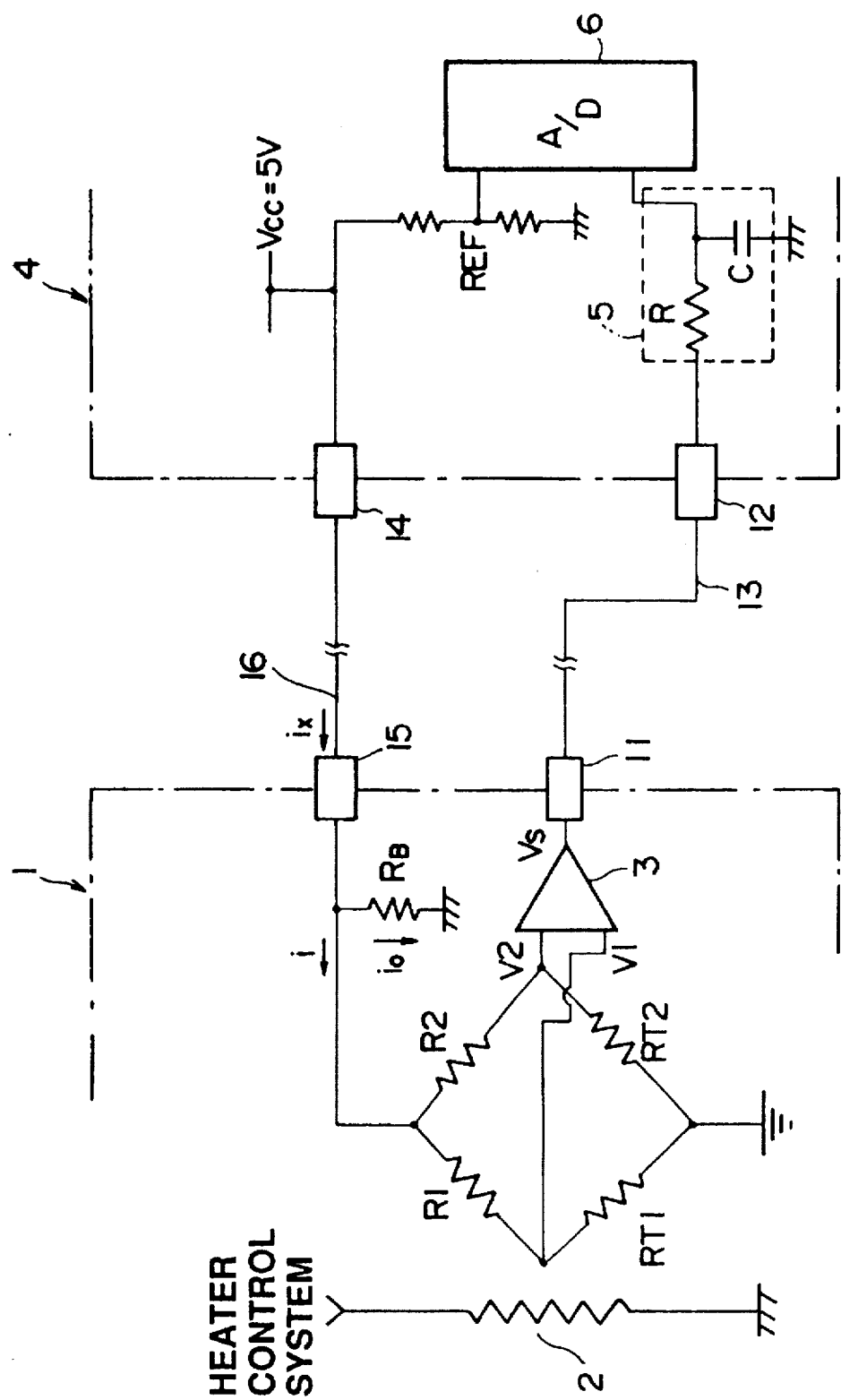
FIG. 1 is a circuit diagram of a temperature-sensitive flow amount detection apparatus according to a first embodiment.

Referring to FIG. 1 illustrating a first embodiment, a detector circuit 1 in the temperature-sensitive flow amount detection apparatus includes a heater 2 that is provided in an intake air passage of an internal combustion engine and is controlled to be maintained at a constant temperature, two temperature-sensitive resistors RT1 and RT2 disposed close to the upstream side and to the downstream side of the heater 2, fixed resistors R1 and R2, and a differential amplifier 3. The differential amplifier 3 receives a terminal voltage V1 of the temperature-sensitive resistor RT1 in a series circuit of the fixed resistor R1 and the temperature-sensitive resistor RT1, and a terminal voltage V2 of the temperature-sensitive resistor RT2 in a series circuit of the fixed resistor R2 and the temperature-sensitive resistor RT2. The differential amplifier 3 produces an output voltage Vs (voltage signal) corresponding to an intake air flow amount of an engine.

In this constitution, when the intake air is in the forward direction, the resistance of the temperature-sensitive resistor RT1 decreases with an increase in the intake air flow amount. However, the temperature-sensitive resistor RT2 located on the downstream side of the heater 2 maintains its resistance nearly constant since it receives heat from the heater 2. When the intake air is in the reverse direction, on the other hand, the resistance of the temperature-sensitive resistor RT2 decreases with an increase in the intake air flow amount. However, the temperature-sensitive RT1 located on the downstream side of the heater 2 maintains its resistance nearly constant since it receives heat from the heater 2.

Therefore, the magnitudes of terminal voltages of the temperature-sensitive resistors RT1, RT2 are inverted depending upon the direction of flow of the intake air, yet the terminal voltage of the temperature-sensitive resistor on the downstream side of the heater 2 is maintained nearly constant. It is therefore made possible to detect the intake air flow amount discriminating the forward direction over the reverse direction based upon the output Vs of the differential amplifier that receives the terminal voltage.

The output voltage Vs (voltage signal) of the differential amplifier 3 is output to a control unit 4 (processing circuit) through a harness 13 connected by connectors (signal connectors) 11 and 12, passes through an RC filter circuit 5 provided in the control unit 4, and is converted into a digital value through an A/D converter 6, to thereby obtain data related to the intake air flow amount Q.

Here, a power source Vcc (usually 5 V) for feeding a reference voltage REF to the A/D converter 6 is fed as a power source voltage to the detector circuit 1 through a harness 16 connected by connectors (power source connectors) 14 and 15. Therefore, even when the power source voltage Vcc undergoes a change, the differential amplifier 3 produces an output Vs as an output which corresponds to the power source voltage that has changed. It is thus made possible to avoid the occurrence of detection error caused by a change in the power source voltage Vcc.

In FIG. 1, furthermore, a pull-down resistor $R_B$ is connected to the power source line between the power source connector 15 on the side of the detector circuit 1 and the detector circuit 1 which comprises temperature-sensitive resistors RT1, RT2, fixed resistors R1, R2, and differential amplifier 3.

According to this constitution, a current ix flowing into the power source terminal is the sum of a current io flowing through the pull-down resistor $R_B$ and a current i flowing into the detector circuit 1. Therefore, provision of the pull-down resistor $R_B$ makes it possible to increase the electric current flowing into the terminals of the power source connectors 14 and 15. An increase in the terminal current makes it possible to suppress the formation of an oxide film on the terminals of the connectors and, hence, to prevent the occurrence of instantaneous breakage of the circuit or poor contact caused by the oxide film.

According to the above-mentioned constitution, furthermore, the terminal current increases by only the current io that flows through the pull-down resistor $R_B$, and the current i that flows into the detector circuit does not increase. Therefore, there is no need to increase the heat capacity for the heat of the temperature-sensitive resistors RT1, RT2, and response characteristics are not deteriorated for a change in the flow amount.

To avoid the formation of the oxide film, the terminal current must be about 1 mA. When, for example, the power source voltage Vcc is 5 V and a current i of as small as about several hundred μA flows the detector circuit, the pull-down resistor $R_B$ may have a resistance of about 5 kΩ.

Figure 2:
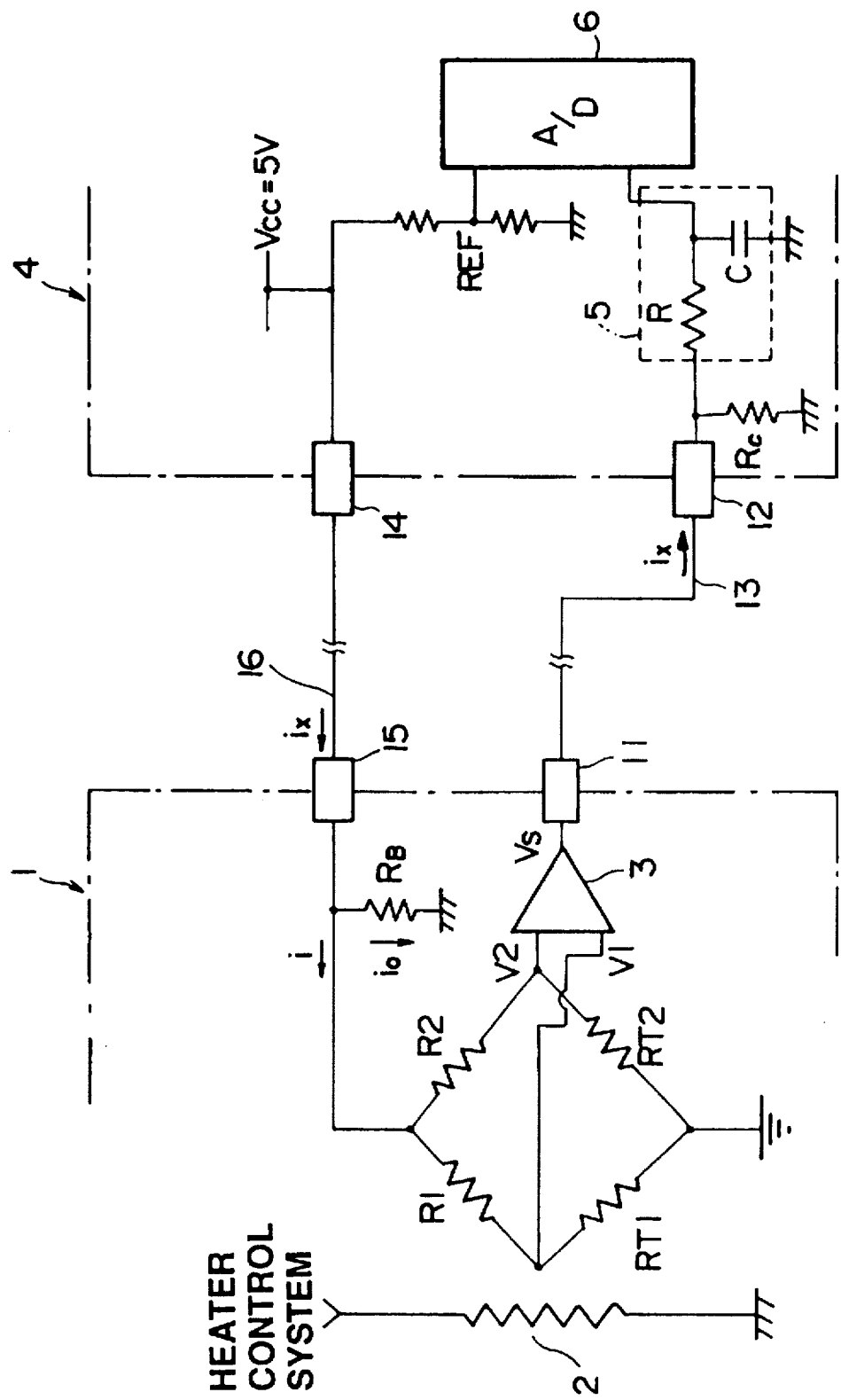
FIG. 2 is a circuit diagram of a temperature-sensitive flow amount detection apparatus according to a second embodiment.

FIG. 2 is a circuit diagram illustrating a second embodiment wherein a pull-down resistor $R_C$ is provided on the side of the control unit 4 (processing circuit) in order to increase the electric current that flows into the connector terminals even on the side of the voltage signal line, in addition to the pull-down resistor $R_B$ connected to the power source line.

The pull-down resistor $R_C$ is connected to the voltage signal line (output line) between the input terminal 12 of the control unit 4 and the filter circuit 5. The electric current flowing into the signal connectors 11, 12 (connector terminals) increases by a current that flows into the pull-down resistor $R_C$ and, hence, formation of the oxide film is suppressed even on the terminals of the output side.

Provision of the pull-down resistor $R_C$ in the preceding stage of the filter circuit 5 makes it possible to avoid a change in time constant of the filter circuit and to prevent a change in the response characteristics in the flow amount detection.

The embodiment shown in FIG. 2 has a constitution for increasing the terminal current when the output current flows from the differential amplifier 3 (detector circuit) to the side of the control unit 4 (processing circuit). In the case of a constitution in which the output current flows from the control unit 4 (processing circuit) to the side of the detector circuit 1, on the other hand, a pull-up resistor $R_A$ may be connected to the output line between the input terminal 12 of the control unit 4 and the filter circuit 5 as shown in a third embodiment of FIG. 3.

Figure 3:
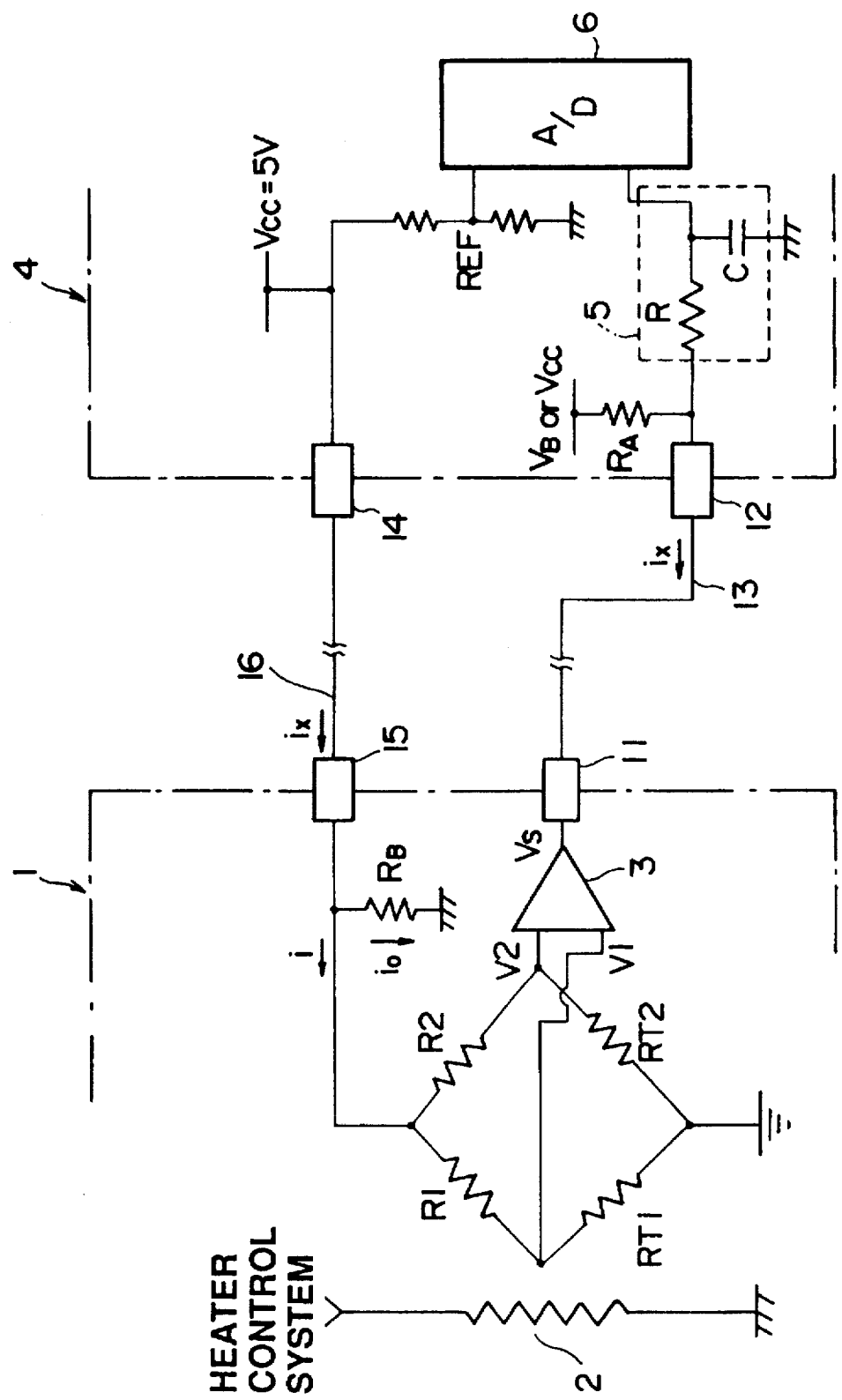
FIG. 3 is a circuit diagram of a temperature-sensitive flow amount detection apparatus according to a third embodiment.

According to the constitution shown in FIG. 3, the current that flows into the side of the differential amplifier 3 increases due to a current that flows into the pull-up resistor $R_A$. It is thus made possible to increase the terminal current on the output side.

The power source for the puff-up resistor $R_A$ may be a power source voltage Vcc of the control unit 4 or may be a battery voltage VB.

In the embodiments shown in FIGS. 2 and 3, the resistors were connected to both the power source line and the output line (voltage signal line) in order to increase the terminal currents. The resistor, however, may be connected to the output line only.

It should further be noted that the detector circuit in the above-mentioned temperature-sensitive flow amount detection apparatus is not limited to the constitutions shown in FIGS. 1 to 3 only, but may be the one which is not equipped with the heater and in which the detector circuit is constituted by a single temperature-sensitive resistor RT only.

We claim:

1. In a temperature-sensitive flow amount detection apparatus for an internal combustion engine, including a detector circuit incorporating a temperature-sensitive resistor disposed in an intake air passage of the internal combustion engine, wherein said detector circuit outputs a voltage signal corresponding to an intake air flow amount of the internal combustion engine to a processing circuit via signal connectors, and said processing circuit supplies a power source voltage to said detector circuit via power source connectors, the improvement comprising suppressing means for suppressing oxide formation on said power source connectors by increasing current flow into said power source connectors, said suppressing means comprising a pull-down resistor connected in parallel with said detector circuit across said power source connectors for increasing an electric current flowing into said power source connectors by a current that flows into said pull-down resistor.

2. In a temperature-sensitive flow amount detection apparatus for an internal combustion engine, including a detector circuit incorporating a temperature-sensitive resistor disposed in an intake air passage of the internal combustion engine, wherein said detector circuit provides via signal connectors from said detector circuit to a processing circuit a voltage signal and a current corresponding to an intake air flow amount of the internal combustion engine, and said processing circuit supplies a power source voltage to said detector circuit via power source connectors, the improvement comprising suppressing means for suppressing oxide formation on said signal connectors by increasing current flow into said signal connectors, said suppressing means comprising a pull-down resistor connected in parallel with said processing circuit across said signal connectors for increasing an electric current flowing into said signal connectors by a current that flows into said pull-down resistor.

3. In a temperature-sensitive flow amount detection apparatus for an internal combustion engine, including a detector circuit incorporating a temperature-sensitive resistor disposed in an intake air passage of the internal combustion engine, wherein said detector circuit provides via signal connectors from said detector circuit to a processing circuit a voltage signal corresponding to an intake air flow amount of the internal combustion engine and wherein a current flows into said detector circuit from said processing circuit via said signal connectors, and said processing circuit supplies a power source voltage to said detector circuit via power source connectors, the improvement comprising suppressing means for suppressing oxide formation on said signal connectors by increasing current flow into said signal connectors, said suppressing means comprising a pull-up resistor connected in parallel with said processing circuit across said signal connectors for increasing an electric current flowing into said signal connectors by a current that flows into said pull-up resistor.

4. A temperature-sensitive flow amount detection apparatus for an internal combustion engine, comprising:

a detector circuit incorporating a temperature-sensitive resistor disposed in an intake air passage of the internal combustion engine, said detector circuit outputting a voltage signal corresponding to an intake air flow amount of the internal combustion engine to a processing circuit via signal connectors, said processing circuit supplying a power source voltage to said detector circuit via power source connectors, and a pull-down resistor connected in series with said power source connectors and in parallel with said detector circuit, an electric current flowing into said power source connectors being increased by a current that flows into said pull-down resistor.

* * * * *